(12) United States Patent
Kondo et al.

(10) Patent No.: US 9,424,966 B2
(45) Date of Patent: Aug. 23, 2016

(54) METHOD FOR FORMING ELECTRICAL CONNECTION STRUCTURE PART, METHOD FOR PRODUCING ALUMINUM WIRE WITH TERMINAL, ELECTRICAL CONNECTION STRUCTURE PART, MOTOR PROVIDED WITH ELECTRICAL CONNECTION STRUCTURE PART, AND ELECTRICAL DEVICE PROVIDED WITH MOTOR PROVIDED WITH ELECTRICAL CONNECTION STRUCTURE PART, ALUMINUM WIRE WITH TERMINAL, MOTOR PROVIDED WITH ALUMINUM WIRE WITH TERMINAL, AND ELECTRICAL DEVICE PROVIDED WITH MOTOR PROVIDED WITH ALUMINUM WIRE WITH TERMINAL

(71) Applicant: Panasonic Intellectual Property Management Co., Ltd., Osaka (JP)

(72) Inventors: Kenji Kondo, Nara (JP); Takehiko Hasegawa, Osaka (JP); Yugo Ryu, Osaka (JP); Akihiko Watanabe, Osaka (JP); Seiji Kurozumi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/404,983

(22) PCT Filed: May 31, 2013

(86) PCT No.: PCT/JP2013/003439
§ 371 (c)(1),
(2) Date: Dec. 2, 2014

(87) PCT Pub. No.: WO2013/183265
PCT Pub. Date: Dec. 12, 2013

(65) Prior Publication Data
US 2015/0187462 A1    Jul. 2, 2015

(30) Foreign Application Priority Data

Jun. 4, 2012  (JP) ................. 2012-126771

(51) Int. Cl.
*H01R 9/24* (2006.01)
*H01B 13/00* (2006.01)
(Continued)

(52) U.S. Cl.
CPC ........... *H01B 13/0036* (2013.01); *B23P 11/00* (2013.01); *H01B 1/02* (2013.01);
(Continued)

(58) Field of Classification Search
USPC ........................................................ 439/887
See application file for complete search history.

(56) References Cited

U.S. PATENT DOCUMENTS 6,139,979 A * 10/2000 Takaoka ............... B23K 35/262
                                                174/263
6,572,420 B2 * 6/2003 Lawrence .............. H01R 13/03
                                                439/887
(Continued)

FOREIGN PATENT DOCUMENTS

CN      101635394      1/2010
CN      201946413 U    8/2011
(Continued)

OTHER PUBLICATIONS

International Search Report for International Application No. PCT/JP2013/003439 mailed Sep. 3, 2013.
(Continued)

*Primary Examiner* — Tho D Ta
(74) *Attorney, Agent, or Firm* — RatnerPrestia (57) ABSTRACT

A method for forming an electrical connection structure part according to the present invention includes a step of covering, with an alloy body, a connection part between a first conductor part and a second conductor part, so as to form the electrical connection structure part. The first conductor part contains aluminum. The second conductor part has a surface covered with an ingredient containing nickel. The alloy body contains tin, silver, and nickel. The method further includes steps of: connecting the first conductor part and the second conductor part to each other to form the connection part; melting the alloy body; and dipping at least the connection part into the molten alloy body.

22 Claims, 8 Drawing Sheets

(51) Int. Cl.
   *H01R 4/02* (2006.01)
   *H01B 7/40* (2006.01)
   *H01R 13/03* (2006.01)
   *H01R 43/16* (2006.01)
   *H02K 3/02* (2006.01)
   *H01R 4/62* (2006.01)
   *H02K 15/00* (2006.01)
   *B23P 11/00* (2006.01)
   *H01B 1/02* (2006.01)

(52) U.S. Cl.
   CPC ............... *H01B 7/40* (2013.01); *H01R 4/023* (2013.01); *H01R 4/625* (2013.01); *H01R 13/03* (2013.01); *H01R 43/16* (2013.01); *H02K 3/02* (2013.01); *H02K 15/0062* (2013.01); *Y10T 29/49179* (2015.01)

(56) References Cited

U.S. PATENT DOCUMENTS

| | | | | |
|---|---|---|---|---|
| 8,445,116 B2* | 5/2013 | Dadvand | ............... | B32B 15/018 428/670 |
| 8,637,165 B2* | 1/2014 | Siahaan | ................. | H01R 13/03 200/269 |
| 8,688,390 B2* | 4/2014 | Schroeder | ............... | H01L 35/34 136/201 |
| 8,728,629 B2* | 5/2014 | Kitagawa | ................. | C25D 5/10 148/525 |
| 2002/0100973 A1* | 8/2002 | Akram | ..................... | H01L 24/11 257/734 |
| 2005/0026515 A1 | 2/2005 | Hashimoto | | |
| 2010/0018768 A1 | 1/2010 | Takahashi et al. | | |
| 2011/0198122 A1* | 8/2011 | Sagawa | .................. | H01R 4/023 174/84 R |
| 2013/0040511 A1 | 2/2013 | Takashima | | |
| 2013/0062114 A1 | 3/2013 | Inoue | | |

FOREIGN PATENT DOCUMENTS

| | | |
|---|---|---|
| CN | 102376447 | 3/2012 |
| JP | 2005050736 | 2/2005 |
| JP | 2007012329 | 1/2007 |
| JP | 2010182566 | 8/2010 |
| JP | 2011029102 | 2/2011 |
| JP | 2011181499 | 9/2011 |
| JP | 2011256429 | 12/2011 |

OTHER PUBLICATIONS

English Translation of Chinese Search Report dated Jul. 3, 2015 for the related Chinese Patent Application No. 201380029244.6.

* cited by examiner

METHOD FOR FORMING ELECTRICAL CONNECTION STRUCTURE PART, METHOD FOR PRODUCING ALUMINUM WIRE WITH TERMINAL, ELECTRICAL CONNECTION STRUCTURE PART, MOTOR PROVIDED WITH ELECTRICAL CONNECTION STRUCTURE PART, AND ELECTRICAL DEVICE PROVIDED WITH MOTOR PROVIDED WITH ELECTRICAL CONNECTION STRUCTURE PART, ALUMINUM WIRE WITH TERMINAL, MOTOR PROVIDED WITH ALUMINUM WIRE WITH TERMINAL, AND ELECTRICAL DEVICE PROVIDED WITH MOTOR PROVIDED WITH ALUMINUM WIRE WITH TERMINAL

This application is a U.S. National Phase Application of PCT International Application PCT/JP2013/003439.

TECHNICAL FIELD

The present invention relates to electrical connection structure a part, a motor provided with the electrical connection structure part, an electrical device provided with the motor, and method for forming the electrical connection structure part. The electrical connection structure part is formed by covering a connection part with an alloy body containing tin, silver, and nickel. The connection part connects a first conductor part containing aluminum to a second conductor part the surface of which is covered with a material containing nickel.

BACKGROUND ART

Conventionally, electrical devices such as transformers, reactors, and magnetrons have employed aluminum wires, aiming at reducing their weights.

However, when an insulated electric wire is used which has a core wire made of aluminum, an oxide film is formed on the surface of aluminum of the core wire exposed to air. Hereinafter, the insulated electric wire is referred to as an aluminum wire.

When the core wire of the aluminum wire is dipped in a molten tin-based alloy, the core wire of the aluminum wire exhibits a low wettability to the molten alloy, compared to a copper wire and the like. The core wire of the aluminum wire has the following problems attributed to the wettability to the molten tin-based alloy. Hereinafter, the tin-based alloy is simply referred to as the alloy or the alloy body.

For example, the wettability to molten alloys is sometimes greatly deteriorated due to an oxide film which is formed on the surface of aluminum of the core wire. In this case, it becomes difficult to join the aluminum wire to another component such as an electric terminal.

That is, when the aluminum wire is joined to another component, unless the wettability to the molten alloy concerned is held, this poses a serious problem in joining the aluminum wire to, such as, a copper wire, another aluminum wire, or an electric terminal made of a metal material different from that of the aluminum wire.

Moreover, in the case where the aluminum wire is connected to an electric terminal or the like with an alloy, a dipping method is applied in which the aluminum wire and the electric terminal are dipped together in the molten alloy, with both being in contact with each other. However, with this method described above, aluminum is eluted to diffuse into the molten alloy, which causes the aluminum wire to become thinner in diameter.

Then, the reduction in diameter of the aluminum wire causes a problem that it becomes difficult to secure the reliability of the joining part of the aluminum wire.

Moreover, when the concentration of aluminum in the molten alloy rises, a film of an aluminum oxide is newly formed at the interface etc. where the molten alloy contacts with the atmosphere. As a result, when the aluminum wire is dipped in the molten alloy, it becomes difficult to make the aluminum wire contact with the molten alloy due to the aluminum oxide film.

Therefore, in the process of dipping the aluminum wire in the molten alloy, it is necessary to prevent joining failures and the like caused by the aluminum oxide film.

Moreover, when the connection is made using the aluminum wire, the standard electrode potential of aluminum is lower than those of other metals including copper, a copper alloy, and tin, which are used to form joining of the connection. As a result, in the contact between aluminum and a dissimilar metal, the aluminum wire poses problems of galvanic corrosion and the like attributed to the difference in standard electrode potential.

Accordingly, a joining technology is also necessary which inhibits the corrosive nature resulted from the galvanic corrosion attributed to the difference in standard electrode potential.

Moreover, aluminum used in the aluminum wire is commonly known to show a large degree of creep characteristics at low temperatures. In addition, aluminum is also commonly known to have a large linear expansion coefficient. Other than the method for connection by dipping the aluminum wire in the molten alloy, a crimping method or the like can be employed as a technique for connecting the aluminum wire to another component. For example, in the case where the aluminum wire is connected to another component by crimping, the crimped portion becomes loose with the lapse of time. The occurrence of looseness in the crimped portion causes contact resistance to rise between the aluminum wire and the component. The rise in the contact resistance, in turn, poses a problem of failure of the electrical device concerned.

Here, a case is considered where the aluminum wire is used, on at least one side, to form an electrical connection structure part which connects the wire to another component such as an electric terminal, for example. In this case, a highly-reliable joining technology has been desired, in consideration of the time-elapsed deterioration in strength and corrosion resistance, attributed to the creep property and the like of aluminum.

Hereinafter, technical trends in recent years will be briefly described, focusing on the case where the aluminum wire is used on one side to form the electrical connection structure part.

Patent Literature 1 discloses the following technology. That is, an oxide film formed on the surface of aluminum of the core wire of an aluminum wire is removed by applying ultrasonic vibrations with an ultrasonic device. Using the aluminum with the oxide film having been removed, an electrical connection structure part is formed. The aluminum wire is joined with another component.

Patent Literature 2 discloses the following technology. That is, the surface of aluminum of the core wire of an aluminum wire is activated to inhibit the formation of an oxide film thereon. Using the aluminum with the formation of the oxide film having been inhibited, an electrical connection structure part is formed. The aluminum wire is joined with another component.

Patent Literature 3 discloses the following technology. That is, an electrical connection structure part using an aluminum wire is protected with a tube or a hot melt adhesive. The protection of the electrical connection structure part allows the prevention of galvanic corrosion which would occur due to contact between the aluminum and a dissimilar metal.

Patent Literature 4 discloses the following technology. That is, as described in Patent Literature 4, a terminal is used which is provided with an insulation barrel for crimping of a covered part of an aluminum wire, a crimping barrel for continuity of the aluminum wire, and a crimping barrel for retaining the aluminum wire. The disclosed technology is such that use of the terminal allows the prevention of looseness which would occur in an electrical connection structure part that is formed by crimping the aluminum wire.

However, the technology described in Patent Literature 1 requires introduction of the ultrasonic device and the like. Accordingly, this requires the cost of introducing large scale equipment and additional man-hours, resulting in a problem.

Moreover, the removal of the film of aluminum oxide by using ultrasonic vibrations increases the possibility of a greater reduction in diameter of the aluminum wire than is desired. Therefore, a new countermeasure is necessary against the deterioration of physical strength of the aluminum wire per se. For example, in the manufacturing process, leveling-out of quality at a high level is required. Such a quality can be attained through fine control of temperature at which the alloy begins to melt, dipping conditions of the aluminum wire into the molten alloy, and the like. This entails additional costs and increased man-hours, resulting in a problem.

Moreover, in the technology described in Patent Literature 2, use of a flux causes a remarkable decrease in diameter of the aluminum wire, which requires another countermeasure against it.

In addition, some kind of technical solution is necessary to address the deteriorated wettability of the molten alloy to the aluminum wire and the galvanic corrosion attributed to the difference in standard electrode potential between the alloy and the aluminum.

Moreover, in the technology described in Patent Literature 3, in order to prevent the galvanic corrosion occurring in the joining part of the aluminum wire, the electrical connection structure part is protected from moisture by using the tube or the hot melt adhesive. This method of protection poses a problem of an increase in material cost and man-hours.

Furthermore, in the technology described in Patent Literature 4, the aluminum wire is joined by crimping with a special terminal. This method requires a special jig for the crimping. In addition, the crimp-joining of the terminal is applied for such an electrical device that is subjected to vibrations caused by a motor or the like. With the crimp-joined terminal, the aluminum exhibits a large degree of creep characteristics at low temperatures. In the joining part, time-elapsed looseness occurs. Then, the looseness in the crimp-joined joining part increases contact resistance and the like, which poses a problem of a decrease in reliability of the electrical device.

In particular, in the case of the aluminum wire being a thin wire, there has been a problem of a significant decrease in the reliability and the like.

CITATION LIST

Patent Literatures

Patent Literature 1: Japanese Patent Unexamined Publication No. 2007-12329
Patent Literature 2: Japanese Patent Unexamined Publication No. 2010-182566
Patent Literature 3: Japanese Patent Unexamined Publication No. 2011-29102
Patent Literature 4: Japanese Patent Unexamined Publication No. 2005-50736

SUMMARY OF THE INVENTION

A method for forming an electrical connection structure part according to the present invention is such that the electrical connection structure part is formed by covering, with an alloy body, a connection part between a first conductor part and a second conductor part.

The first conductor part contains aluminum. The second conductor part is such that the surface thereof is covered with an ingredient containing nickel. The alloy body contains tin, silver, and nickel.

Specifically, the method includes the following steps: That is, a step of forming the connection part by connecting the first conductor part and the second conductor part; a step of melting the alloy body; and a step of dipping at least the connection part into the molten alloy body.

Moreover, a method for manufacturing an aluminum wire with terminal, a prominent and specific example of the invention described above, is such that the aluminum wire and the terminal are electrically connected to each other with the alloy body.

The aluminum wire includes the conductor part containing aluminum and a covering material including an insulating material to cover the conductor part. The terminal is such that the surface thereof is covered with the ingredient containing nickel. The alloy body contains tin, silver, and nickel.

Then, the method includes the following steps: That is, a step of removing a part of the covering material from the aluminum wire; a step of attaching the terminal to the conductor part uncovered where the part of the covering material has been removed; a step of melting the alloy body; and a step of dipping, into the molten alloy body, both the uncovered conductor part and the terminal attached to the conductor part.

Moreover, the electrical connection structure part according to the present invention includes the first conductor part, the second conductor part, and the alloy body. The first conductor part contains aluminum. The second conductor part is such that the surface thereof is covered with the ingredient containing nickel. The alloy body covers the connection part between the first conductor part and the second conductor part to electrically connect between the first and second parts. The alloy body contains tin, silver, and nickel.

Furthermore, the aluminum wire with terminal, a prominent and specific example of the invention described above, includes the aluminum wire, the terminal, and the alloy body. The aluminum wire includes the conductor part containing aluminum and a covering material including an insulating material to cover the conductor part. The terminal is such that the surface thereof is covered with the ingredient containing nickel. The terminal is attached to the conductor part. The alloy body contains tin, silver, and nickel. The alloy body electrically connects between the conductor part and the terminal.

DESCRIPTION OF EMBODIMENTS

The present invention is intended to reduce elution of nickel into a molten alloy, by employing a method for forming an electrical connection structure part or employing a method for manufacturing an aluminum wire with terminal, in accordance with embodiments to be described later.

Accordingly, this allows an improved corrosion resistance of the electrical connection structure part, and allows a stabilized wettability of the molten alloy to the electrical connection structure part.

As a result, reliability of the electrical connection structure part is increased.

Likewise, this allows an improved corrosion resistance of the aluminum wire with terminal, and allows a stabilized wettability of the molten alloy to the aluminum wire with terminal.

As a result, reliability of the aluminum wire with terminal is increased.

Moreover, the present invention makes it possible to implement the highly-reliable electrical connection structure part even when the aluminum wire has a small diameter, by using the electrical connection structure part according to the respective embodiments to be described later.

Furthermore, it is possible to provide a motor including the electrical connection structure part and an electrical device equipped with the motor, leading to the highly reliable motor and electrical device.

Likewise, the present invention makes it possible to implement the highly-reliable electrical connection structure part even when the aluminum wire has a small diameter, by using the aluminum wire with terminal according to the respective embodiments to be described later.

In addition, it is possible to provide a motor including the aluminum wire with terminal and an electrical device equipped with the motor, leading to the highly reliable motor and electrical device.

As a method for joining conventional aluminum wires to other components, the present inventors have proposed an addition of nickel to an alloy.

Through further examination in this technical field, the inventors have found out the following aspect to be improved.

That is, in the case of joining an aluminum wire to another component, if a molten alloy contains zinc therein, it inhibits alloy's wettability.

Moreover, in manufacturing the aluminum wire with terminal, the concentration of nickel is required to be maintained within an appropriate range. In order to maintain the concentration of nickel within the appropriate range, the component in a molten alloy-body bath is monitored, and the molten alloy-body bath is required to be replenished with the component whenever the component is found to be insufficient through the monitoring. Alternatively, the molten alloy in the molten alloy-body bath is required to be replaced on a regular basis. Such a manufacturing method is cumbersome, leading to low workability.

Hence, by the method for forming the electrical connection structure part or the method for manufacturing the aluminum wire with terminal in the respective embodiments to be described later, the elution of nickel into the molten alloy is reduced, with the workability being improved.

Moreover, the present invention makes it possible to implement the highly-reliable electrical connection structure part with the workability being improved even when the aluminum wire has a small diameter, by using the aluminum wire with terminal according to the respective embodiments to be described later.

Hereinafter, the present invention will be described with reference to the accompanying drawings and tables. It is noted, however, that the following embodiments are each nothing more than an example in which the present invention offers outstanding advantages, and do not constitute any limitation on the technical scope of the invention.

First Exemplary Embodiment

Figure 1:
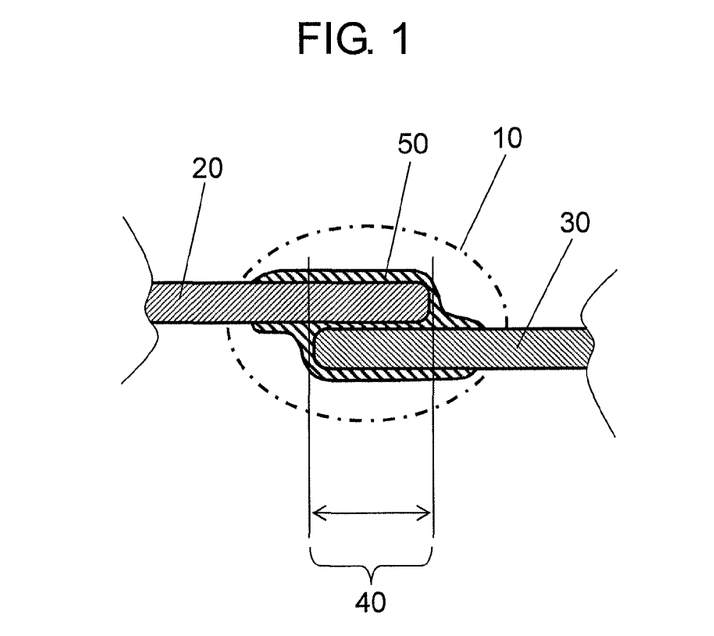
FIG. 1 is a cross-sectional view of an electrical connection structure part according to a first embodiment of the present invention.
Figure 2:
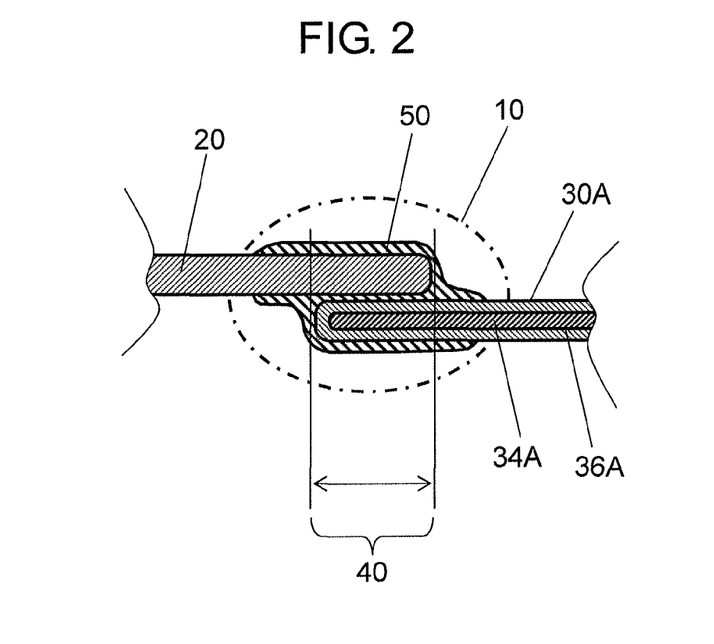
FIG. 2 is a cross-sectional view of another electrical connection structure part according to the first embodiment of the invention.

FIG. 1 is a cross-sectional view of an electrical connection structure part according to a first embodiment of the present invention. FIG. 2 is a cross-sectional view of another electrical connection structure part according to the first embodiment of the invention.

As shown in FIG. 1, electrical connection structure part 10 according to the embodiment includes first conductor part 20, second conductor part 30, and alloy body 50 that covers connection part 40 between first conductor part 20 and second conductor part 30.

First conductor part 20 contains aluminum (Al). First conductor part 20 may be an aluminum alloy (Al alloy).

Second conductor part 30 is such that the surface thereof is covered with an ingredient containing nickel (Ni). Second conductor part 30 may be implemented by using a copper-nickel alloy (Cu—Ni alloy) containing copper (Cu). Alternatively, as shown in FIG. 2, second conductor part 30A may also be implemented by using core material 34A formed of an alloy of copper and zinc (Zn), with core material 34A being plated with plating layer 36A containing nickel as a principal component. Further alternatively, second conductor part 30A may also be implemented by using core material 34A formed of an alloy (Phosphor Bronze) of copper, tin (Sn), and phosphorus (P), with core material 34A being plated with plating layer 36A containing nickel as the principal component.

Alloy body 50 contains tin, silver (Ag), and nickel. Alloy body 50 contains nickel in the range of 0.2 weight percent to 0.6 weight percent. Preferably, alloy body 50 contains nickel in the range of 0.4 weight percent to 0.5 weight percent. Alloy body 50, with tin being as a principal component, contains silver in the range of 2 weight percent to 4 weight percent. Preferably, alloy body 50 contains 3.5 weight percent of silver. Alloy body 50 covers connection part 40 between first conductor part 20 and second conductor part 30 or 30A to electrically connect between them.

Next, with reference to FIGS. 3 to 6, a specific example of the first conductor part and the second conductor part will be described.

Figure 3:
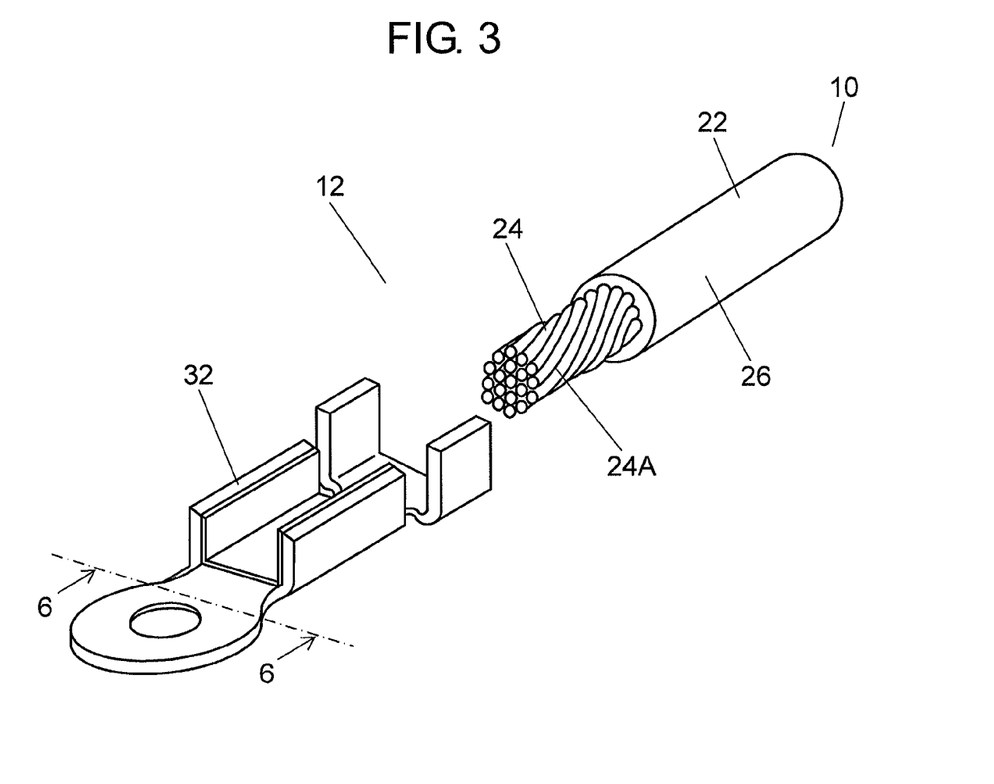
FIG. 3 is a perspective view of an aluminum wire with terminal, in a state of being assembled, according to the first embodiment of the invention.
Figure 4:
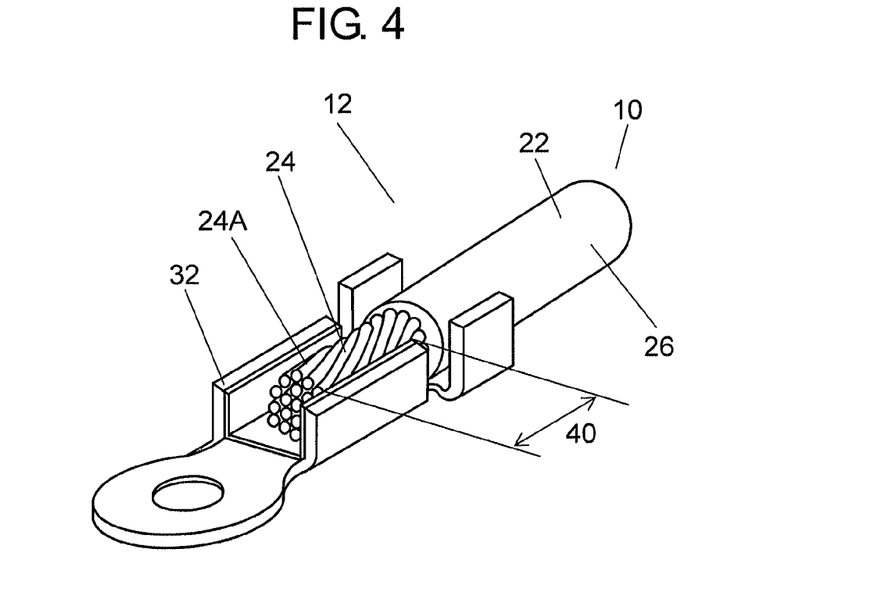
FIG. 4 is a perspective view of the aluminum wire with terminal, in another state of being assembled, according to the first embodiment of the invention.
Figure 5:
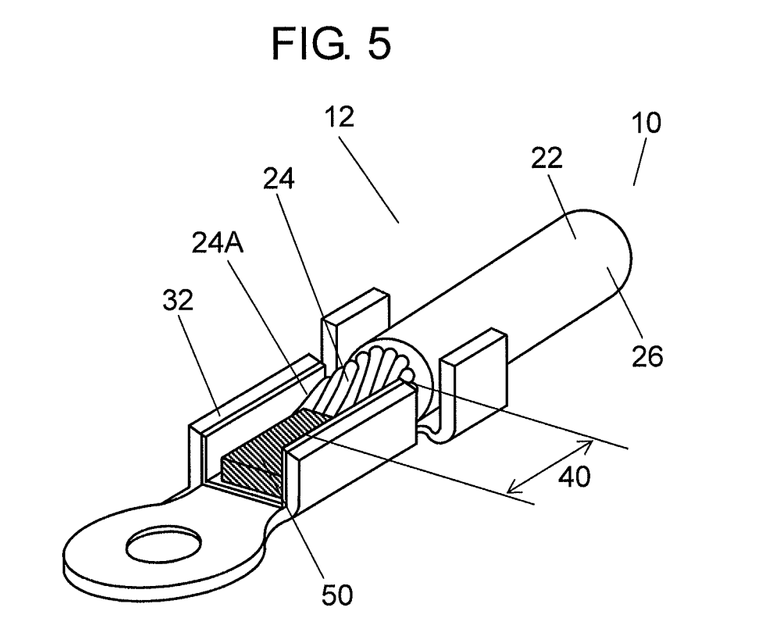
FIG. 5 is a perspective view of the aluminum wire with terminal, in yet another state of being assembled, according to the first embodiment of the invention.
Figure 6:
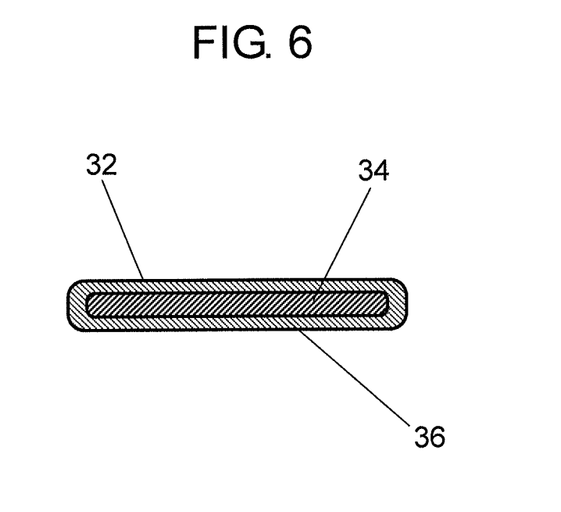
FIG. 6 is a cross-sectional view taken along line 6-6 of FIG. 3.

FIG. 3 is a perspective view of an aluminum wire with terminal, in a state of being assembled, according to the first embodiment of the invention. FIG. 4 is a perspective view of the aluminum wire with terminal, in another state of being assembled, according to the first embodiment of the invention. FIG. 5 is a perspective view of the aluminum wire with terminal, in yet another state of being assembled, according to the first embodiment of the invention. FIG. 6 is a cross-sectional view taken along line 6-6 of FIG. 3.

As shown in FIGS. 3 to 5, aluminum wire with terminal 12 according to the embodiment of the present invention includes aluminum wire 22, terminal 32, and alloy body 50.

Aluminum wire 22 includes conductor part 24 serving as the first conductor part, and covering material 26 including an insulating material to cover conductor part 24. Conductor part 24 contains aluminum (Al). Conductor part 24 may be an aluminum alloy (Al alloy). Covering material 26 may be any material as long as it has insulating performance.

Terminal 32 serving as the second conductor part is such that the surface thereof is covered with an ingredient containing nickel (Ni). Terminal 32 is attached to conductor part 24. Terminal 32 may be implemented by using a copper-nickel alloy (Cu—Ni alloy) containing copper (Cu). Alternatively, as shown in FIG. 6, terminal 32 may also be implemented by using core material 34 formed of an alloy of copper and zinc (Zn), with core material 34 being plated with plating layer 36 containing nickel as a principal component.

Further descriptions will be made in more detail. As shown in FIG. 3, a part of covering material 26 is removed from aluminum wire 22, so that conductor part 24 forming the connection part becomes uncovered. As shown in FIG. 4, conductor part 24 is disposed at an appropriate location with respect to terminal 32. As shown in FIG. 5, connection part 40 composed of uncovered conductor part 24 and terminal 32 is covered with alloy body 50.

Alloy body 50 contains tin (Sn), silver (Ag), and nickel. As described above, preferably, alloy body 50 contains nickel in the range of 0.2 weight percent to 0.6 weight percent. Alloy body 50 contains about 3.5 weight percent of silver, with tin being as the principal component. Alloy body 50 covers connection part 40 composed of conductor part 24 and terminal 32 to electrically connect between them.

As described above, the aluminum wire with terminal that includes the conductor part serving as the first conductor part is used in transformers, reactors, motors, and the like, for example.

Figure 7:
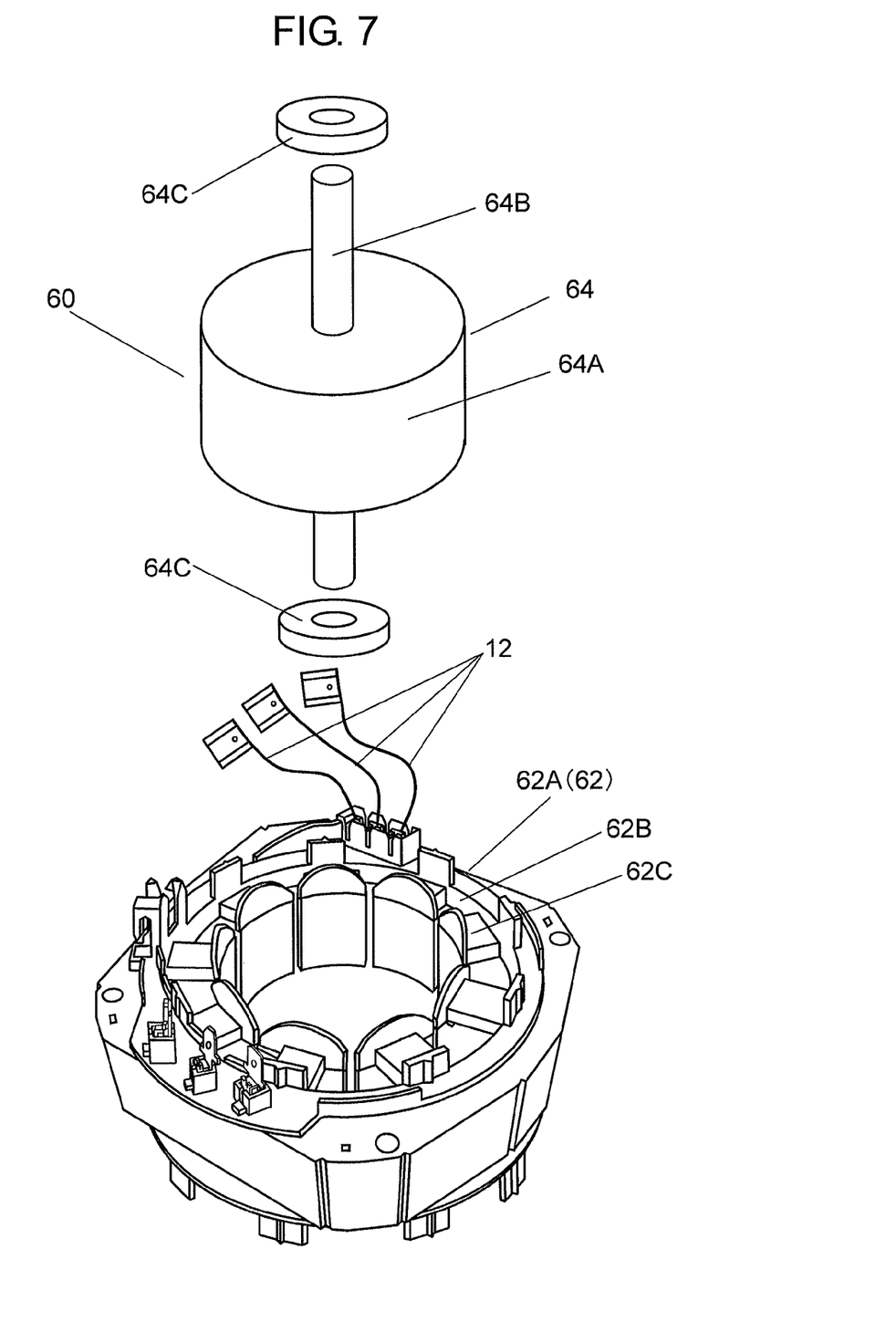
FIG. 7 is a perspective assembly view of a motor using the aluminum wire with terminal according to the first embodiment of the invention.
Figure 8:
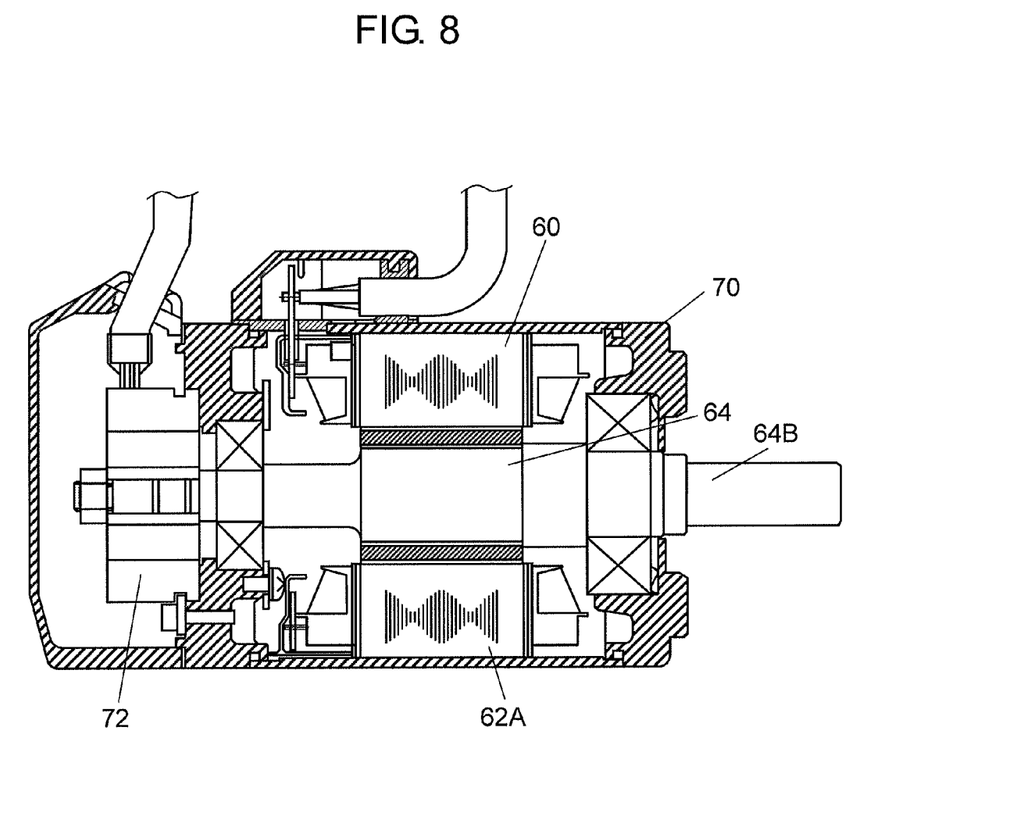
FIG. 8 is a cross-sectional view of a compressor using the motor according to the first embodiment of the invention.
Figure 9:
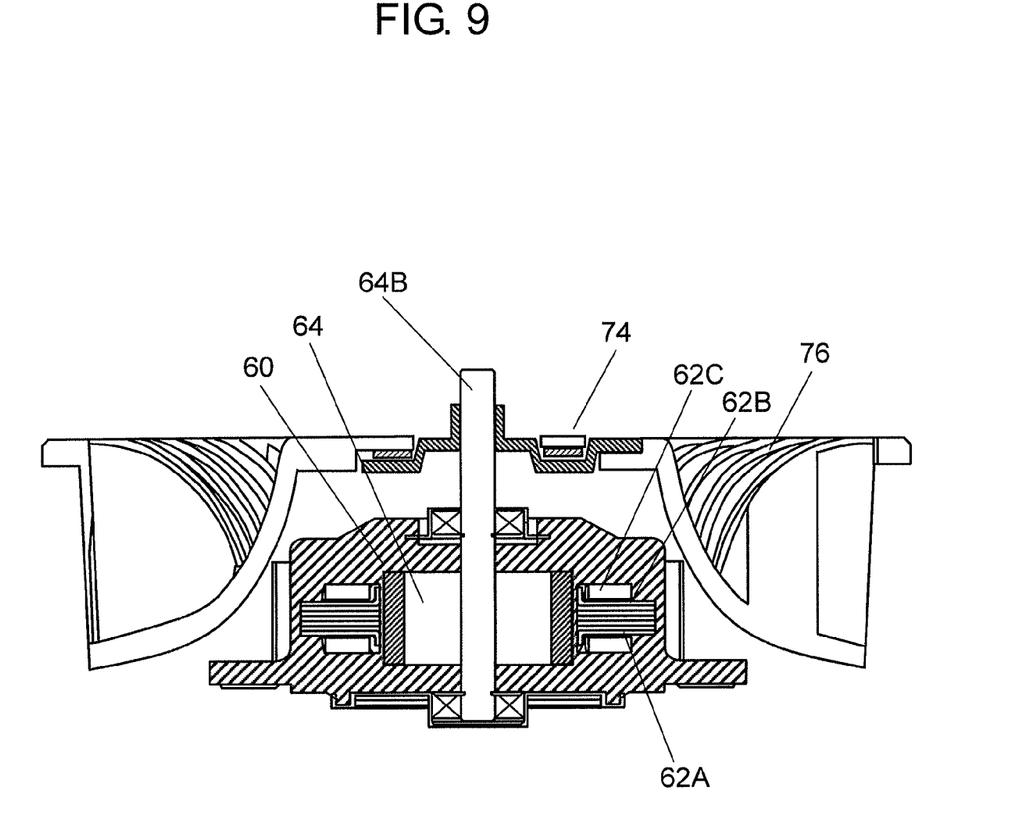
FIG. 9 is a cross-sectional view of a blower using the motor according to the first embodiment of the invention.

FIG. 7 is a perspective assembly view of a motor using the aluminum wire with terminal according to the first embodiment of the invention. FIG. 8 is a cross-sectional view of a compressor using the motor according to the first embodiment of the invention. FIG. 9 is a cross-sectional view of a blower using the motor according to the first embodiment of the invention.

As shown in FIG. 7, motor 60 includes aluminum wire with terminal 12 described above and to-be-connected connection part 62 to which aluminum wire with terminal 12 is connected.

As shown in FIG. 7, motor 60 includes rotor 64 and stator 62A serving as the to-be-connected connection part. Rotor 64 is such that rotor core 64A is attached to shaft 64B. Rotor 64 is rotatably attached with a pair of bearings 64C.

Stator 62A includes stator core 62B. On stator core 62B, coil 62C is wound through which a control current to drive motor 60 is passed. To coil 62C, the control current is supplied via aluminum wire with terminal 12.

The motor according to the embodiment of the present invention, together with a to-be-driven unit that is driven by the motor, is used in electrical devices.

As an example of the electrical devices, FIG. 8 shows a specific case where the motor is used in the compressor. Likewise, FIG. 9 shows another specific case where the motor is used in the blower.

As shown in FIG. 8, compressor 70, i.e. the electrical device, includes motor 60 and compressing unit 72, i.e. the to-be-driven unit driven by motor 60.

As shown in FIG. 9, blower 74, i.e. the electrical device, includes motor 60 and fan 76, i.e. the to-be-driven unit driven by motor 60.

It is noted, however, that the second conductor part may be one, besides the terminal described above, that is a wiring pattern formed of a copper wiring or aluminum wiring of a circuit board, for example.

That is, in accordance with the embodiment of the present invention, the first conductor part containing aluminum and the second conductor part the surface of which is covered with the ingredient containing nickel, are electrically connected to each other via the alloy body containing tin, silver, and nickel. This configures the electrical connection structure part. The alloy body includes the predetermined contents described above of nickel and silver, with tin being the principal component.

With this configuration, it is possible to join the first conductor part to the second conductor part via the electrical connection structure part, which features high mechanical strength, excellent electrical characteristics, and highly reliable resistance to galvanic corrosion, impact, and the like.

Especially, in recent years, aluminum wire with terminals have been demanded in applications in the fields where low cost and reduced weight are desired. The use of the aluminum wire with terminal according to the embodiment makes it possible to meet such the demand.

Hereinafter, a method for forming the electrical connection structure part according to the embodiment of the present invention will be described. It is noted that the description will be made through illustration of a method for manufacturing the aluminum wire with terminal, which is a specific example of the embodiment.

Figure 10:
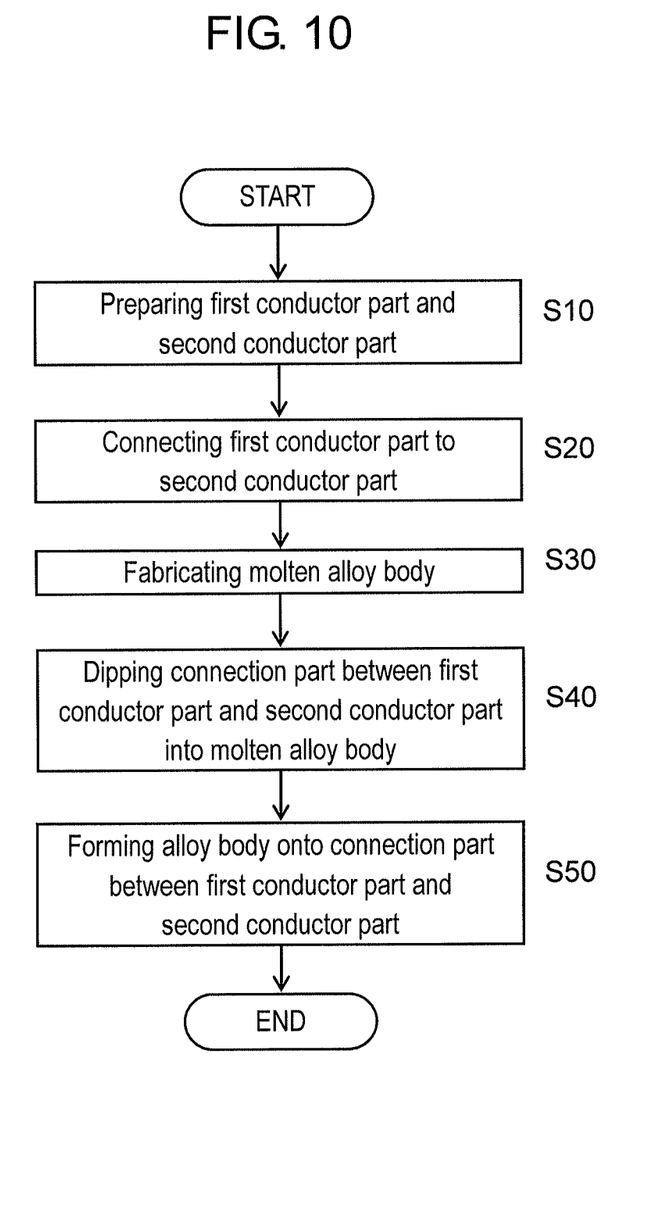
FIG. 10 is a flowchart illustrating a method for forming the electrical connection structure part according to the first embodiment of the invention.

FIG. 10 is a flowchart illustrating the method for forming the electrical connection structure part according to the first embodiment of the invention. Hereinafter, following FIG. 10, the description will be made regarding the method for manufacturing the aluminum wire with terminal, which is a specific example of the embodiment.

Referring to FIGS. 3 to 6 described above and FIG. 10 as well, the description of the method for manufacturing the aluminum wire with terminal is made.

As shown in FIG. 3, aluminum wire 22 includes conductor part 24 containing aluminum and covering material 26 including the insulating material to cover conductor part 24. Aluminum wire 22 includes stranded wire 24A, composed of aluminum, which serves as conductor part 24 corresponding to the first conductor part. First, aluminum wire 22 is processed in such a manner that a predetermined length of covering material 26 is removed with a rotary blade-type stripping machine, for example.

Terminal 32 is such that the surface thereof is covered with the ingredient containing nickel. Terminal 32 corresponds to the second conductor part. Terminal 32 can be implemented by using the copper-nickel alloy containing copper. Alternatively, as shown in FIG. 6, terminal 32 may also be implemented by using core material 34 formed with the alloy of copper and zinc, with core material 34 being plated with plating layer 36 containing nickel as the principal component.

In this way, there are prepared aluminum wire 22 with aluminum stranded wire 24A corresponding to the first conductor part, and terminal 32 corresponding to the second conductor part (Step S10).

Next, as shown in FIG. 4, aluminum stranded wire 24A and terminal 32 are aligned such that they overlap each other at within an appropriate region. The region where aluminum stranded wire 24A and terminal 32 overlap each other is connection part 40 (Step S20).

Next, the alloy body is introduced in an alloy-body bath. The alloy body contains tin as the principal component, nickel, and silver. For example, the alloy body contains nickel in the range of 0.2 weight percent to 0.6 weight percent. The alloy body contains 3.5 weight percent of silver. The alloy-body bath is heated to 400° C., for example. The alloy body is heated and melted in the alloy-body bath, thereby preparing the molten alloy body (Step S30).

Next, aluminum stranded wire 24A serving as the uncovered conductor part and terminal 32 attached to aluminum stranded wire 24A, with both being aligned, are dipped in the molten alloy body for a predetermined period of time (e.g. 2 seconds) (Step S40).

Then, connection part 40 between aluminum stranded wire 24A and terminal 32 is covered with alloy body 50 to form the electrical connection structure part. Connection part 40 between aluminum stranded wire 24A and terminal 32 is electrically connected by alloy body 50 (Step S50).

With the procedure described above, it is possible to form the electrical connection structure part that features high mechanical strength, excellent electrical characteristics, and highly reliable resistance to galvanic corrosion, impact, and the like. The electrical connection structure part is formed in the connection part composed of the aluminum stranded wire corresponding to the first conductor part and the terminal corresponding to the second conductor part.

Hereinafter, referring to FIGS. 11 and 12 and Tables 1 and 2, descriptions will be made regarding appropriate contents of nickel and silver that are contained in the alloy body forming the electrical connection structure part, according to the embodiment of the present invention. Note that, in the following descriptions, the terms of "concentration" and "content" are used in a mixed manner; however, both as used herein have the same technical meaning.

COMPARATIVE EXAMPLES

Figure 11:
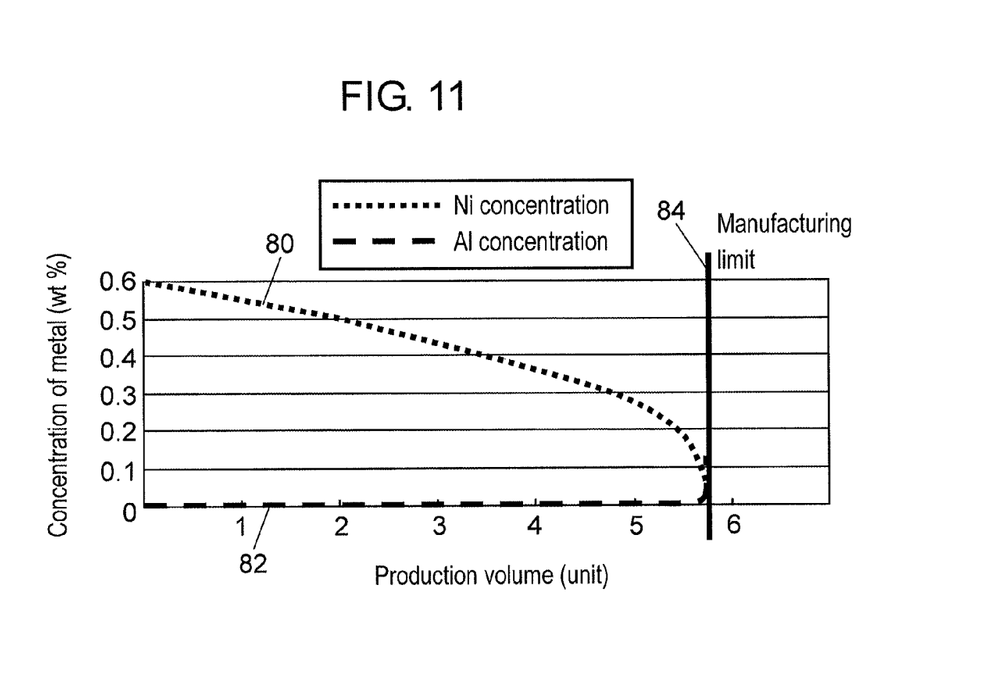
FIG. 11 is an illustrative graph showing a relation between the concentrations of metals in a molten alloy body and the volume of manufacture, which is to be compared with that according to the first embodiment of the invention.

FIG. 11 is an illustrative graph showing a relation between the volume of manufacture and the concentrations of metals in a molten alloy body, which is to be compared with that according to the first embodiment of the present invention. The three lines in FIG. 11 show the respective following items. Line 80 indicating the concentration of nickel (Ni) shows variations in concentration of nickel (Ni). Line 82 indicating the concentration of aluminum (Al) shows variations in concentration of aluminum (Al). Line 84 indicating a manufacturing limit shows the limit of manufacturing an electrical connection structure part, i.e. the limit of forming it.

Hereinafter, a factor in placing the limit of manufacturing the electrical connection structure part is described.

As shown in FIG. 11, in general, when an aluminum wire is dipped in a molten alloy body containing tin as a principal component, the aluminum in the aluminum wire is eluted into the molten alloy body. The eluted aluminum reacts with nickel in the molten alloy body to form intermetallic compounds such as $Al_3Ni$. As a result, the content of nickel in the molten alloy body decreases, leading to a decrease in the concentration of nickel, with increasing volume of the manufacture.

Then, as shown in FIG. 11, when the concentration of nickel in the molten alloy body containing tin as the principal component decreases to be smaller than 0.1 weight percent, for example, the concentration of aluminum in the molten alloy body increases abruptly to form aluminum oxide at the interface where the molten alloy body contacts with the atmosphere and the like. For this reason, the wettability of the aluminum wire to the molten alloy body deteriorates rapidly, which causes the surface of the aluminum wire to becomes unwetted with the molten alloy body. Eventually, when the nickel in the molten alloy body becomes depleted, the alloy body becomes unable to cover the connection part between the first conductor part and the second conductor part. This causes the difficulty of forming the electrical connection structure part, leading to a manufacturing limit, i.e. the limit of manufacturing indicated by line 84.

Conventionally, in the situation describe above, the molten alloy body with nickel depleted by consumption is replaced by a new alloy body containing a predetermined content of nickel. Alternatively, in order to avoid the situation described above, the concentration of nickel in the alloy-body bath is monitored and controlled by adding, when deemed appropriate, a new alloy body containing a predetermined content of nickel.

Next, a relation between the concentration of nickel in the molten alloy body and the galvanic corrosion resistance of the aluminum wire is described using Table 1.

To obtain the relation, the concentrations of nickel and the galvanic corrosion resistance of the aluminum wires were evaluated under the following conditions.

First, using a starting material that was a tin-based alloy body containing 3.5 weight percent of silver (Ag), alloy bodies were prepared such that respective one of them contains nickel in a different concentration, ranging from 0 (zero) weight percent to 0.8 weight percent. The thus-prepared alloy bodies were heated up to 400° C. in respective alloy-body baths. The heated alloy bodies melted in the respective alloy-body baths, thereby preparing molten alloy-body baths corresponding to the respective concentrations of nickel.

Then, tin-plated terminals were dipped in the respective molten alloy-body baths, such that the molten tin-based alloy bodies with the different concentrations of nickel stuck on the respective terminals. After that, the terminals with the alloy bodies sticking thereon were left in water containing chlorine ions. Then, the evaluation in terms of galvanic corrosion resistance was carried out by measuring the period of time until when each of the tin-based alloy bodies peeled off the terminal. In the evaluation, the galvanic corrosion resistance is determined with a reference (one-fold) being the period of time until when the alloy body having the concentration of 0 (zero) weight percent of nickel peels off.

The result is shown in Table 1.

TABLE 1

| Ni concentration (wt %) | Galvanic corrosion resistance |
|---|---|
| 0 | 1 time |
| 0.1 | 3 to 4 times |
| 0.2 | 12 to 15 times |
| 0.4 | 12 to 15 times |
| 0.8 | 12 to 15 times |

(with a content of 3.5 weight percent of Ag)

As shown in Table 1, it can be seen that, when the concentration of nickel is not smaller than 0.1 weight percent, the galvanic corrosion resistance is improved by a factor of several to ten and several more. In particular, when the concentration of nickel is not smaller than 0.2 weight percent, the galvanic corrosion resistance is improved by a factor of 12 to 15. On the other hand, however, when the concentration of nickel is further increased to be 0.4 weight percent to 0.8 weight percent, the galvanic corrosion resistance remains unchanged from that for the case of the concentration of nickel of 0.2 weight percent.

That is, it can be seen that, when the concentration of nickel in the molten alloy body is set to be not smaller than 0.1 weight percent, or preferably not smaller than 0.2 weight percent, the electrical connection structure part is provided with the galvanic corrosion resistance higher than that resulting from the alloy body devoid of nickel.

Note that, if there is a possibility that the concentration of nickel would become smaller than 0.2 weight percent, it requires taking countermeasures against possible galvanic corrosion, such as coating of the part concerned with an organic material, or the like.

Next, a relation between the concentration of nickel in the molten alloy body and the remaining diameter of the aluminum wire is described using Table 2.

To obtain the relation, the concentrations of nickel and the remaining diameters of the aluminum wires were evaluated under the following conditions.

First, using a starting material that was a tin (Sn)-based alloy body containing 3.5 weight percent of silver (Ag), alloy bodies were prepared such that respective one of them contains nickel in a different concentration, ranging from 0 (zero) weight percent to 0.6 weight percent. The thus-prepared alloy bodies were heated up to 400° C. in respective alloy-body baths. The heated alloy bodies melted in the respective alloy-body baths, thereby preparing molten alloy-body baths corresponding to the respective concentrations of nickel.

Next, with a rotary blade-type stripping machine, an insulating layer was stripped from each of the aluminum wires with a diameter φ of 0.4 mm. After that, the uncovered aluminum wires were applied with a flux and then dipped in the respective molten alloy-body baths. In the step, the aluminum core wires were dipped in the respective molten alloy bodies for 2 seconds. After that, the diameters of the aluminum core wires of the aluminum wires were measured.

The result is shown in Table 2.

TABLE 2

| Ni concentration (wt %) | Remaining wire diameter (%) |
|---|---|
| 0 | 83 |
| 0.1 | 89 |
| 0.2 | 94 |
| 0.4 | 96 |
| 0.6 | 96 |

(with a content of 3.5 weight percent of Ag)

As shown in Table 2, it can be seen that the decrease in diameter of the aluminum wires can be reduced when the concentration of nickel is not smaller than 0.1 weight percent. Moreover, when the concentration of nickel is set to be not smaller than 0.2 weight percent, the remaining diameters of the aluminum wires are about 94%, resulting in a great inhibition against the decrease in wire diameter. On the other hand, however, when the concentration of nickel is further increased to be not smaller than 0.4 weight percent, it does not show a great influence on the decrease in wire diameter.

That is, by setting the concentration of nickel in the molten alloy body to be not smaller than 0.1 weight percent, or preferably not smaller than 0.2 weight percent, it is possible to prevent the elution of aluminum from the aluminum wires, thereby preventing the decrease in wire diameter.

This is thought to be attributed to the acceleration of formation of composite intermetallic compounds of Al/Ag/Ni on the surface of the aluminum stranded wire. With this acceleration, the elution of aluminum into the molten alloy body is prevented, which thereby inhibits the decrease in the concentration of nickel.

Note that, when there is a possibility of the concentration of nickel becoming smaller than 0.2 weight percent, it is thought that the strength of joining parts in the electrical device concerned is difficult to ensure. Lack of the ensured strength of the joining parts in the electrical device causes a possibility of being unable to provide the highly-reliable electrical device.

EXAMPLES

Figure 12:
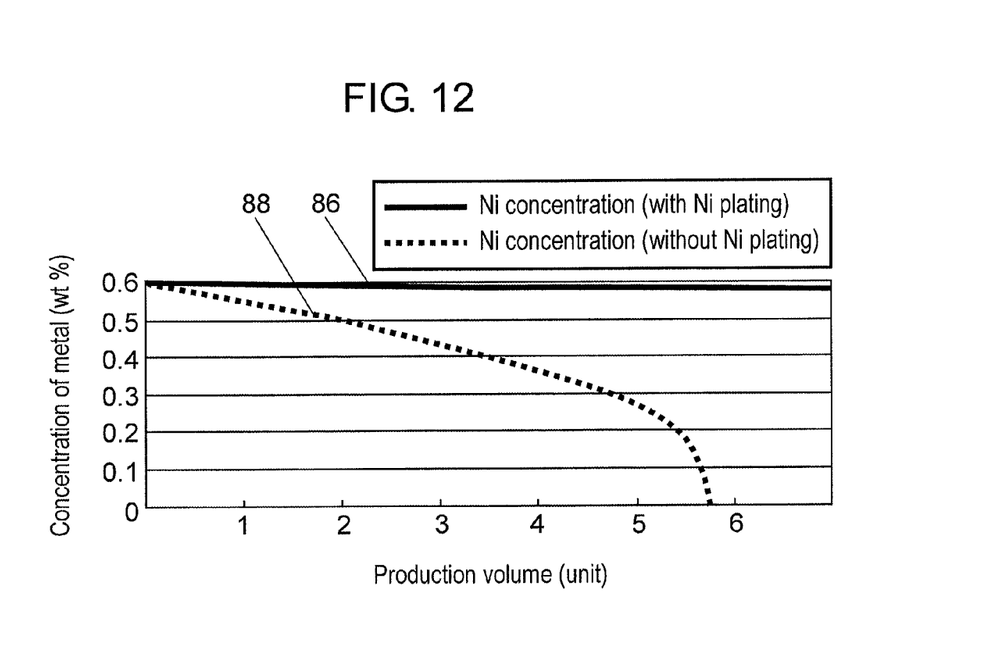
FIG. 12 is an illustrative graph showing a relation between the concentration of metal in a molten alloy body and the volume of manufacture, according to the first embodiment of the invention.

FIG. 12 is an illustrative graph showing a relation between the concentration of metal in the molten alloy body according to the first embodiment of the invention and the volume of manufacture.

Specifically, the graph shows the relation between the concentration of nickel and the allowable production volume of the electrical connection structure parts in the case where terminals are dipped in the molten alloy-body baths described above. The dipped terminals each have a core material of phosphor bronze, and have been subjected to the following plating. The plating is performed in such a manner that a core material of the terminal is firstly plated with nickel as strike plating, followed by further plating with tin on top of the nickel plating. The plating layer with a peripheral surface containing a principal component of nickel, as referred in the present invention, includes one that has a multilayer structure including two or more layers. The multilayer structure is formed by applying nickel plating as strike plating, followed by applying tin plating on top of the nickel plating.

The two lines of FIG. 12 show the following items. Line 86 indicating the concentration of nickel (Ni) shows variations in the concentration of nickel in the molten alloy body against the production volume of the terminals, for the case where the terminals serving as the second conductor parts have been subjected to the nickel plating.

Moreover, line 88 indicating the concentration of nickel (Ni) shows variations in the concentration of nickel in the molten alloy body against the production volume of the terminals, for the case where the terminals serving as the second conductor parts have not been subjected to the nickel plating, i.e. the terminals without nickel plating.

Hereinafter, descriptions will be made regarding functional advantages in the case where the second conductor part is subjected to the nickel plating, according to the embodiment of the present invention.

First, for the case where the second conductor parts without nickel plating are manufactured, the concentration of nickel varies against the production volume, as shown by line 88 indicating the concentration of nickel (Ni). When the concentration of nickel decreases, it becomes difficult to form the electrical connection structure part with high quality. Specifically, the concentration of nickel smaller than 0.2% weight percent makes it difficult to ensure the electrical connection structure part with high quality.

Conventionally, countermeasures against this have been taken in such a manner that, after every removal of the molten body of the tin-based alloy at regular intervals, it is replaced with a new one, i.e. a new molten body of a flesh alloy (an alloy bar or alloy block). The replacement with the new molten body ensures the wettability of the molten alloy to the aluminum wire. This makes it possible to ensure the galvanic corrosion resistance of the electrical joining part and to prevent the decrease in diameter of the aluminum wire.

In contrast, when nickel plating is applied to the second conductor part according to the embodiment of the present invention, the productivity can be further increased for the reason to be described below.

The reason is as follows: Into the molten alloy body, there are dipped the aluminum stranded wire and the terminal the core material of which has been subjected to the nickel plating as strike plating. At this time, the aluminum eluted into the molten alloy body reacts with the nickel, which has been plated as the strike plating, to form intermetallic compounds such as $Al_3Ni$. The formation of the intermetallic compounds including $Al_3Ni$ consumes nickel, results in a decrease in nickel in the molten alloy body.

However, in manufacturing the aluminum wires with terminals, a lot of the nickel-plated terminals are dipped one after another into the molten alloy body.

That is, the molten alloy body whose nickel component has been consumed to form intermetallic compounds such as $Al_3Ni$, is replenished with nickel that comes from the terminals sequentially dipped into the molten alloy body.

As a result, in the molten alloy body, the concentration of nickel is maintained within a predetermined range. The concentration of nickel is preferably within the range of 0.2 weight percent to 0.6 weight percent. With this configuration, there is no need for the step of supplying nickel at regular intervals or replacing the molten alloy body at regular intervals, which results in the increased productivity.

In addition, zinc is not eluted into the molten alloy-body bath, resulting in the prevention of decreased wettability.

Therefore, the concentration of aluminum in the molten alloy body is inhibited from rising. As a result, the concentration of nickel in the molten alloy body is inhibited from decreasing.

Consequently, in FIG. 12, as can be seen from line 86 indicating the concentration of nickel (Ni), the wettability of the molten alloy to the aluminum stranded wire is continuously ensured. Therefore, it becomes possible to ensure the galvanic corrosion resistance and to prevent the reduction in diameter of the aluminum wire, allowing the formation of the highly-reliable electrical connection structure part.

Moreover, use of the electrical connection structure part allows the motor that is equipped with the highly-reliable aluminum wire with terminal.

Furthermore, use of the motor also makes it possible to provide highly-reliable electrical devices.

The aforementioned descriptions have been made using the terminal in which the core material is made of phosphor bronze, and the core material is plated with nickel as strike plating.

Instead of this terminal, another terminal which is formed by plating a nickel-alloy terminal with tin may also be used to achieve the same advantages.

Further, for the alloy-body bath described above, commercially available one may be employed. The alloy-body bath is applicable as long as it has a function of heating the alloy body up to temperatures higher than the alloy's melting point. To heat the alloy-body bath, an electric heater or the like is employed. The alloy-body bath may be applicable as long as the temperature thereof can be set to a specific temperature. In addition, the alloy-body bath may be applicable as long as it has a function of controlling temperature to hold the temperature constant at a preset temperature.

INDUSTRIAL APPLICABILITY

The application field to which the present invention is applicable includes motors and electronic devices which employ the aluminum wires with terminals, and includes electrical devices equipped with the motors and the electronic devices. In particular, the invention is advantageous for motors that are desired to be reduced in weight because of their strong vibrations, for compressors and blower which are equipped with the motors, and for the like.

The invention claimed is:

1. An electrical connection structure part, comprising:
a first conductor part containing aluminum;
a second conductor part having a plating layer containing nickel; and
an alloy body covering a connection part between the first conductor part and the plating layer of the second conductor part so as to electrically connect the parts to each other, the alloy body containing tin, silver, and nickel.

2. A motor comprising: the electrical connection structure part as set forth in claim 1; and a to-be-connected connection part to which the electrical connection structure part is connected.

3. An electrical device comprising: the motor as set forth in claim 2; and a to-be-driven unit driven by the motor.

4. The electrical connection structure part according to claim 1, wherein a content of the nickel in the alloy body is in a range of 0.2 weight percent to 0.6 weight percent.

5. The electrical connection structure part according to claim 4, wherein the second conductor part is a copper-nickel alloy containing further copper.

6. The electrical connection structure part according to claim 4, wherein the plating layer contains the nickel as a principal component.

7. A motor comprising: the electrical connection structure part as set forth in claim 4; and a to-be-connected connection part to which the electrical connection structure part is connected.

8. The electrical connection structure part according to claim 1, wherein the second conductor part is a copper-nickel alloy containing further copper.

9. A motor comprising: the electrical connection structure part as set forth in claim 8; and a to-be-connected connection part to which the electrical connection structure part is connected.

10. The electrical connection structure part according to claim 1, wherein the plating layer contains the nickel as a principal component.

11. A motor comprising: the electrical connection structure part as set forth in claim 10; and a to-be-connected connection part to which the electrical connection structure part is connected.

12. An aluminum wire with terminal, comprising:
an aluminum wire including:
  a conductor part containing aluminum; and
  a covering material including an insulating material to cover the conductor part;
a terminal attached to the conductor part, and having a plating layer containing nickel; and
an alloy body electrically connecting an uncovered portion of the conductor part to the plating layer of the terminal, and containing tin, silver, and nickel.

13. A motor comprising: the aluminum wire with terminal as set forth in claim 12; and a to-be-connected connection part to which the aluminum wire with terminal is connected.

14. An electrical device comprising: the motor as set forth in claim 13; and a to-be-driven unit driven by the motor.

15. The aluminum wire with terminal according to claim 12, wherein a content of the nickel in the alloy body is in a range of 0.2 weight percent to 0.6 weight percent.

16. The aluminum wire with terminal according to claim 15, wherein the terminal is formed with a copper-nickel alloy containing further copper.

17. The aluminum wire with terminal according to claim 15, wherein the plating layer contains the nickel as a principal component.

18. A motor comprising: the aluminum wire with terminal as set forth in claim 15; and a to-be-connected connection part to which the aluminum wire with terminal is connected.

19. The aluminum wire with terminal according to claim 12, wherein the terminal is formed with a copper-nickel alloy containing further copper.

20. A motor comprising: the aluminum wire with terminal as set forth in claim 19; and a to-be-connected connection part to which the aluminum wire with terminal is connected.

21. The aluminum wire with terminal according to claim 12, wherein the plating layer contains the nickel as a principal component.

22. A motor comprising: the aluminum wire with terminal as set forth in claim 21; and a to-be-connected connection part to which the aluminum wire with terminal is connected.

* * * * *